Sept. 8, 1953 E. T. INGRAM 2,651,551
PULL ROD LOCK FOR PUMPS
Filed Nov. 21, 1949
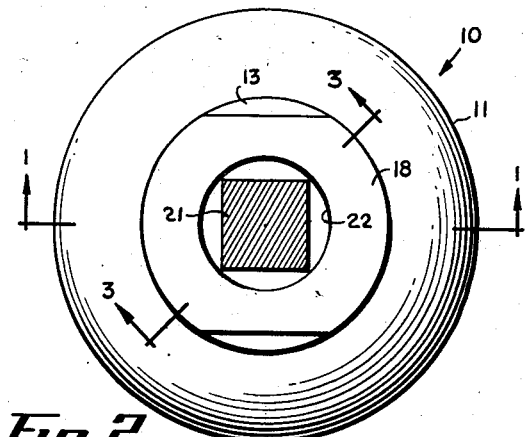
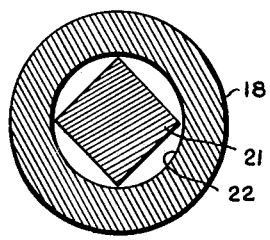
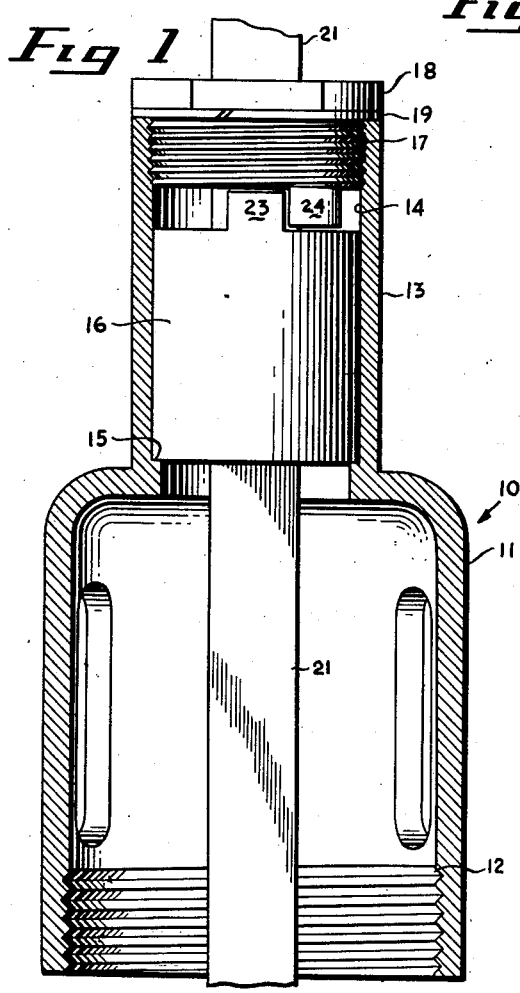
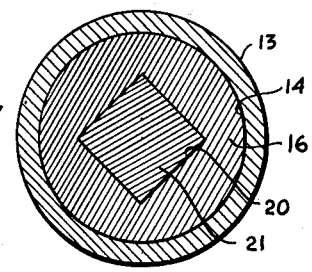
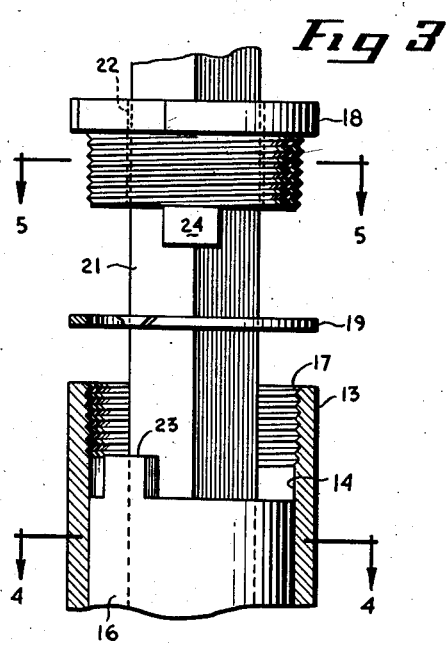
INVENTOR.
Evert T. Ingram
BY C. Lauren Maltby
ATTORNEY Patented Sept. 8, 1953

2,651,551

UNITED STATES PATENT OFFICE 2,651,551

PULL ROD LOCK FOR PUMPS

Evert T. Ingram, Compton, Calif.

Application November 21, 1949, Serial No. 128,610

5 Claims. (Cl. 308—3)

This invention relates to pumping machinery and more especially to a pump rod cage for the pump rod.

An object of the invention is to provide a simple, practical and inexpensive device of the character described.

Another object of the invention is to provide improvements in a pump cage for the pull rod of a pump whereby the pull rod is prevented from turning more than a pre-determined maximum amount.

A further object of the invention is to provide a bushing mounting for the pull rod of a pump, the rod having a non-circular cross section and the bushing having a corresponding bearing passage whereby the pull rod is permitted to turn a small amount but is prevented from working loose from the supporting gear.

An additional object of the invention is to provide a pull rod having a square section and a bushing having a similar section, the bushing being mounted in a cage which permits the bushing to turn a restricted amount whereby the pull rod is prevented from working loose from its supporting gear.

Other objects and advantages will appear and be brought out more fully in the following specification, reference being had to the accompanying drawing wherein:

Fig. 1 is a view in sectional elevation of a pump cage embodying a preferred form of my invention.

Fig. 2 is a top plan view of the same.

Fig. 3 is a sectional view taken along the line 3—3 of Fig. 2 showing the parts partially disassembled.

Fig. 4 is a sectional view taken along the line 4—4 of Fig. 3.

Fig. 5 is a sectional view taken along the line 5—5 of Fig. 3.

Referring more particularly to the drawing I show a pump cage 10 which is generally cylindrical in shape, having a body 11 threaded at 12 for connection to a pump of the type usually employed in the oil industry.

Cage 10 has a neck 13 formed with a bore 14, and an annular shoulder 15 for seating a cylindrical bushing 16. Bore 14 is threaded at 17 for a lock nut 18, which together with a lock washer 19, may be locked in place at the top of neck 13.

Bushing 16 has a square opening or aperture 20 therethrough, through which extends a pump pull rod 21 which has a corresponding square section, and lock nut 18 has an aperture 22 which permits pull rod 21 to move freely therethrough.

Bushing 16 has an upstanding lug 23, and nut 18 has a depending lug 24, there being a clearance between the top of lug 23 and the bottom of nut 18, and likewise a clearance between the bottom of lug 24 and the top of bushing 16. Lugs 23 and 24 are seen to have a small angular dimension, and it should be clear that lug 24 serves as an angular stop for lug 23 of bushing 16 if and when the bushing 16 is caused to turn due to the turning of the pull rod 21.

The operation of the invention should be obvious from the foregoing description. Aperture 20 in bushing 16 provides a bearing for pull rod 21, and as this pull rod works there is usually some tendency for it to turn or rotate, and a limited rotation is permitted by bushing 16, but this rotation is limited within an arc of less than one turn and less than 360 degrees. This construction prevents the rods below from turning and working loose.

It will be understood that the foregoing description is illustrative rather than restrictive of my invention and that changes and modifications may be made without departing from the spirit and scope of the sub-joined claims.

Having described my invention what I claim is:

1. A bearing cage adapted for attachment to a pump means having a non-circular cross-section as described, comprising in combination a body having a bore formed with a seat, a bushing on said seat having a non-circular aperture for said means, a bushing retaining collar having threaded engagement in said bore, and means to permit limited rotation of said bushing in said bore, said means comprising interengaging lugs on said bushing and collar.

2. A bearing cage adapted for attachment to a pump means having a non-circular cross-section as described, comprising in combination a body having a bore formed with a seat, a bushing on said seat having a non-circular aperture for said means, a bushing retaining collar having threaded engagement in said bore, and means to permit limited rotation of said bushing in said bore, said means comprising axially extending interengaging lugs on said bushing and collar.

3. A bearing cage adapted for attachment to a pump means having a non-circular cross-section as described, comprising in combination a body having a bore formed with a seat, a bushing on said seat having a polygonal aperture for said means, a bushing retaining collar having threaded engagement in said bore, and means to permit limited rotation of said bushing in said bore, said means comprising axially extending interengaging lugs on said bushing and collar.

4. A bearing cage adapted for attachment to a pump means having a non-circular cross-section as described, comprising in combination a body having a bore formed with a seat, a bushing on said seat having a rectangular aperture for said means, a bushing retaining collar having threaded engagement in said bore, and means to permit limited rotation of said bushing in said bore, said means comprising axially extending interengaging lugs on said bushing and collar.

5. A bearing cage adapted for attachment to a pump means having a non-circular cross-section as described, comprising in combination a body having a bore formed with a seat, a bushing on said seat having a square aperture for said means, a bushing retaining collar having threaded engagement in said bore, and means to permit limited rotation of said bushing in said bore, said means comprising axially extending interengaging lugs on said bushing and collar.

EVERT T. INGRAM.

References Cited in the file of this patent

UNITED STATES PATENTS

| Number | Name | Date |
|---|---|---|
| 538,436 | Sullivan | Apr. 30, 1895 |
| 906,228 | Hervey | Dec. 8, 1908 |
| 1,688,483 | Bushong | Oct. 23, 1928 |
| 1,957,795 | Mulert | May 8, 1934 |